(12) United States Patent
Imoto

(10) Patent No.: US 8,103,146 B2
(45) Date of Patent: Jan. 24, 2012

(54) DVD PLAYER AND OPTICAL DISK REPRODUCING APPARATUS

(75) Inventor: Yoshinobu Imoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1512 days.

(21) Appl. No.: 10/784,805

(22) Filed: Feb. 24, 2004

(65) Prior Publication Data

US 2004/0228621 A1 Nov. 18, 2004

(30) Foreign Application Priority Data

Feb. 25, 2003 (JP) ................ P2003-046925

(51) Int. Cl.
*H04N 5/765* (2006.01)
*H04N 9/82* (2006.01)
(52) U.S. Cl. ........................ 386/200; 386/246
(58) Field of Classification Search ............ 386/46
See application file for complete search history.

(56) References Cited

U.S. PATENT DOCUMENTS

| | | | | |
|---|---|---|---|---|
| 5,349,348 A | * | 9/1994 | Anderson et al. | 341/51 |
| 5,469,272 A | * | 11/1995 | Kubota et al. | 386/75 |
| 5,818,364 A | * | 10/1998 | Hintzman et al. | 341/65 |
| 6,853,841 B1 | * | 2/2005 | St. Pierre | 455/420 |
| 6,937,356 B1 | * | 8/2005 | Ito et al. | 358/1.16 |
| 2002/0126987 A1 | * | 9/2002 | Kamiya | 386/68 |
| 2003/0118327 A1 | * | 6/2003 | Um et al. | 386/95 |

FOREIGN PATENT DOCUMENTS

| | | |
|---|---|---|
| JP | 9-65290 A | 3/1997 |
| JP | 2001-169251 | 6/2001 |
| JP | 2002-140196 | 5/2002 |
| JP | 2002-170323 | 6/2002 |

* cited by examiner

*Primary Examiner* — William C Vaughn, Jr.
*Assistant Examiner* — Oluwaseun A Adegeye
(74) *Attorney, Agent, or Firm* — Morgan, Lewis & Bockius LLP

(57) ABSTRACT

In an optical disk reproducing apparatus, when an extension of a still image file whose reproduction is instructed is JPG, the optical disk reproducing apparatus analyzes a header and determines whether or not the still image file is a still image file of a format capable of reproduction. In the case of determining that the still image file is a still image file of a format incapable of reproduction herein, a video signal indicating its fact is outputted. As a result of this, a user can speedily be notified that the still image file whose reproduction is instructed is a file incapable of reproduction, and operability of the user can be improved.

3 Claims, 4 Drawing Sheets

SPECIFIED FILE CANNOT
BE REPRODUCED

DVD PLAYER AND OPTICAL DISK REPRODUCING APPARATUS

BACKGROUND OF THE INVENTION

1. Field of the Invention

This invention relates to an optical disk apparatus for outputting a reproduction video signal based on a still image file read from an optical disk, and particularly to a DVD apparatus having a reproduction function of moving image data and a still image file.

2. Description of the Related Art

Conventionally, a DVD player for reading moving image data recorded on a DVD and outputting a video signal (moving image) based on this moving image data has become popular. A reproduction video signal outputted from the DVD player is inputted to a display device having a display screen, for example, a television image receiver and is displayed on this display device. Sound data and moving image data compressed by MPEG2 are recorded on the DVD. The DVD player is provided with a decoder of MPEG2.

Also, there are many users who record a photography image (still image) taken by a digital camera on a CD and retain the image, and the users desired to reproduce the photography image recorded on the CD by the display device connected to the DVD player. In consideration of this desire, means for providing a function of reproducing a still image file in the DVD player has been proposed. By the way, various file formats of the still image file include JPEG, GIF, PICT, etc., and decoders for the file formats differ from one another. Therefore, it is impractical in view of costs to make a body of a DVD player cope with still image files of all the file formats.

Thus, since a pickup image picked up is a file of a JPEG format in a general digital camera, in order to suppress an increase in cost of the body and meet a desire of the users, the conventional DVD player is constructed so that a function (decoder) of reproducing a still image file of the JPEG format is provided and the still image file of the JPEG format can be reproduced (still images of the other file formats cannot be reproduced).

The DVD player having a function of reproducing the still image file of this JPEG format is generally called a DVD player with a JPEG reproduction function. When reproduction of a still image file is instructed, it is determined whether or not a file format of its still image file is a JPEG format (it is determined whether or not an extension of a file is JPG), and when the file format is the JPEG format, reproduction processing of the still image file specified is started. When the file format is not the JPEG format, error processing is performed and the users are notified that the still image file cannot be reproduced.

Incidentally, in order to be constructed so as to be able to cope with plural code patterns without preparing plural decoding parts in an information reproducing apparatus, means for recording a program (decoding processing program) used in decoding processing on a record medium and decoding data read from the record medium by the decoding processing program read from the record medium at the time of reproduction is proposed in JP-A-2002-140196. However, since this proposal presumes that the program (decoding processing program) used in decoding processing is recorded on the record medium, when a user writes a still image file on a CD, a corresponding decoding processing program must be written together with this still image file and an operation for writing the still image file on the CD becomes complicated and also time necessary for processing becomes long and as a result, operability is deteriorated.

The JPEG format includes formats of base line JPEG, progressive JPEG and lossless JPEG. The progressive JPEG is JPEG for gradually displaying an image. The DVD player with a JPEG reproduction function includes a decoder which does not cope with the progressive JPEG for the purpose of suppressing an increase in cost of the body as described above and a photography image of a digital camera recorded on a CD is reproduced and can be viewed by a display device connected to the DVD player.

As a result of this, when reproduction of a still image file of the progressive JPEG format is instructed, a file extension is JPG, so that the DVD player starts reproduction processing and at a point in time of detecting that decoding cannot be performed in the decoder, error processing is performed. Because of this, there was a problem that time necessary to notify the user that the still image file whose reproduction is instructed cannot be reproduced is long and operability of the user is deteriorated.

SUMMARY OF THE INVENTION

An object of the invention is to provide an optical disk reproducing apparatus and a DVD player for improving operability by shortening time taken to notify a user that a still image file cannot be reproduced by determining whether or not decoding can be performed in a decoder by analyzing a header of the still image file before starting reproduction processing.

In order to solve the object, an optical disk apparatus according to an aspect of the invention includes: a body; reading means for reading image data recorded on an optical disk set in the body; decoding means for decoding the image data read by the reading means; video signal output means for outputting a reproduction video signal of the image data decoded by the decoding means; determination means in which when an extension of a still image file instructed to be reproduced is a predetermined extension, a header of the still image file is analyzed and it is determined whether or not the still image file is a still image file that is decodable in the body; and reading stop means for stopping reading of the still image file by the reading means when the determination means determines that the still image file is the still image file that is not decodable in the body.

In this configuration, when an extension of a still image file whose reproduction is instructed is a predetermined extension, for example, JPG, the determination means analyzes a header of this still image file and determines whether or not the still image file is a still image file that is decodable. In the case of determining that the still image file is a still image file that is not decodable in this determination, reading of the still image file in the reading means is stopped and decoding of the still image file whose reproduction is instructed is not started. Therefore, when the still image file specified by a user is a still image file incapable of reproduction, that fact can speedily be recognized by the user and operability can be improved.

Preferably, by outputting a predetermined video signal, for example, a video signal for notifying a user of being a still image incapable of reproduction when the determination means determines that the still image file is the still image file that is not decodable, the fact that the still image file whose reproduction is instructed cannot be reproduced can surely be recognized by the user.

Preferably, a DVD player having a function of reproducing moving image data compressed in MPEG2 is provided with the function and thereby, a photography image of a digital camera recorded on a CD is reproduced by the DVD player and can be viewed on a display device connected to this DVD player.

DETAILED DESCRIPTION OF THE PREFFERED EMBODIMENTS

A DVD player according to an embodiment of the invention will be described below.

Figure 1:
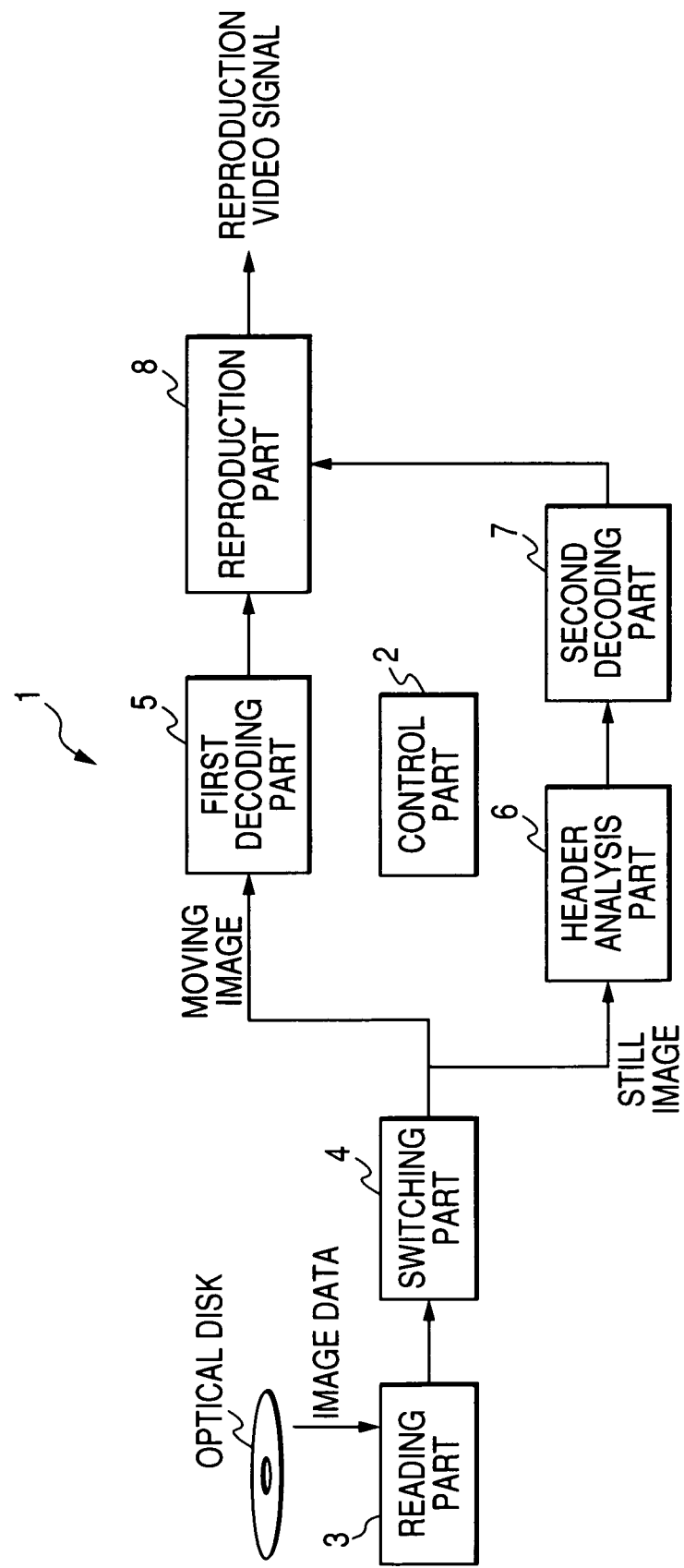
FIG. 1 is a block diagram showing a functional configuration of a DVD player according to an embodiment of this invention.

FIG. 1 is a block diagram showing a functional configuration of a DVD player according to an embodiment of the invention. A DVD player 1 of this embodiment includes a reading part 3 for reading image data recorded on an optical disk (CD or DVD) set in a body, a switching part 4 for switching an input destination of the image data read by the reading part 3, a first decoding part 5 for decoding moving image data whose reproduction is instructed, a header analysis part 6 for analyzing a header of a still image file whose reproduction is instructed, a second decoding part 7 for decoding the still image file inputted, and a reproduction part 8 for outputting a reproduction video signal in which the inputted image data (still image or moving image) is processed. Also, numeral 2 shown in FIG. 1 is a control part for controlling an action of the body.

The reading part 3 is provided with a pickup head for reading the image data recorded on the optical disk set in the body. The switching part 4 inputs image data (including sound data) read from this DVD by the reading part 3 to the first decoding part 5 when reproduction of the DVD set in the body is instructed, and inputs image data read from this CD by the reading part 3 to the second decoding part 7 through the header analysis part 6 when reproduction of the still image file recorded on the CD set in the body is instructed.

The first decoding part 5 is a decoder for decoding moving image data (including sound data) compressed by MPEG2, and the second decoding part 7 is a decoder for decoding a still image file compressed by JPEG. This second decoding part 7 can decode a still image file compressed in a base line JPEG format or a lossless JPEG format, but cannot decode a still image file compressed in a progressive JPEG format.

The header analysis part 6 analyzes a header of a still image file (still image file whose reproduction is instructed) recorded on the optical disk (CD) set in the body, and determines whether or not this still image file is a file of a progressive JPEG format. In the still image file of the progressive JPEG format, [FFC2] is present in a marker included in the header. The header analysis part 6 detects whether or not there is a marker of [FFC2] in the header of the still image file whose reproduction is instructed.

The reproduction part 8 generates a reproduction video signal based on the image data decoded by the first decoding part 5 or the second decoding part 7, and outputs this signal. An apparatus having a display device such as a television image receiver is connected to the reproduction part 8, and video based on the reproduction video signal outputted is displayed on this display device.

Incidentally, the reproduction part 8 has a function of outputting a reproduction sound signal as well as the reproduction video signal.

Figure 2:
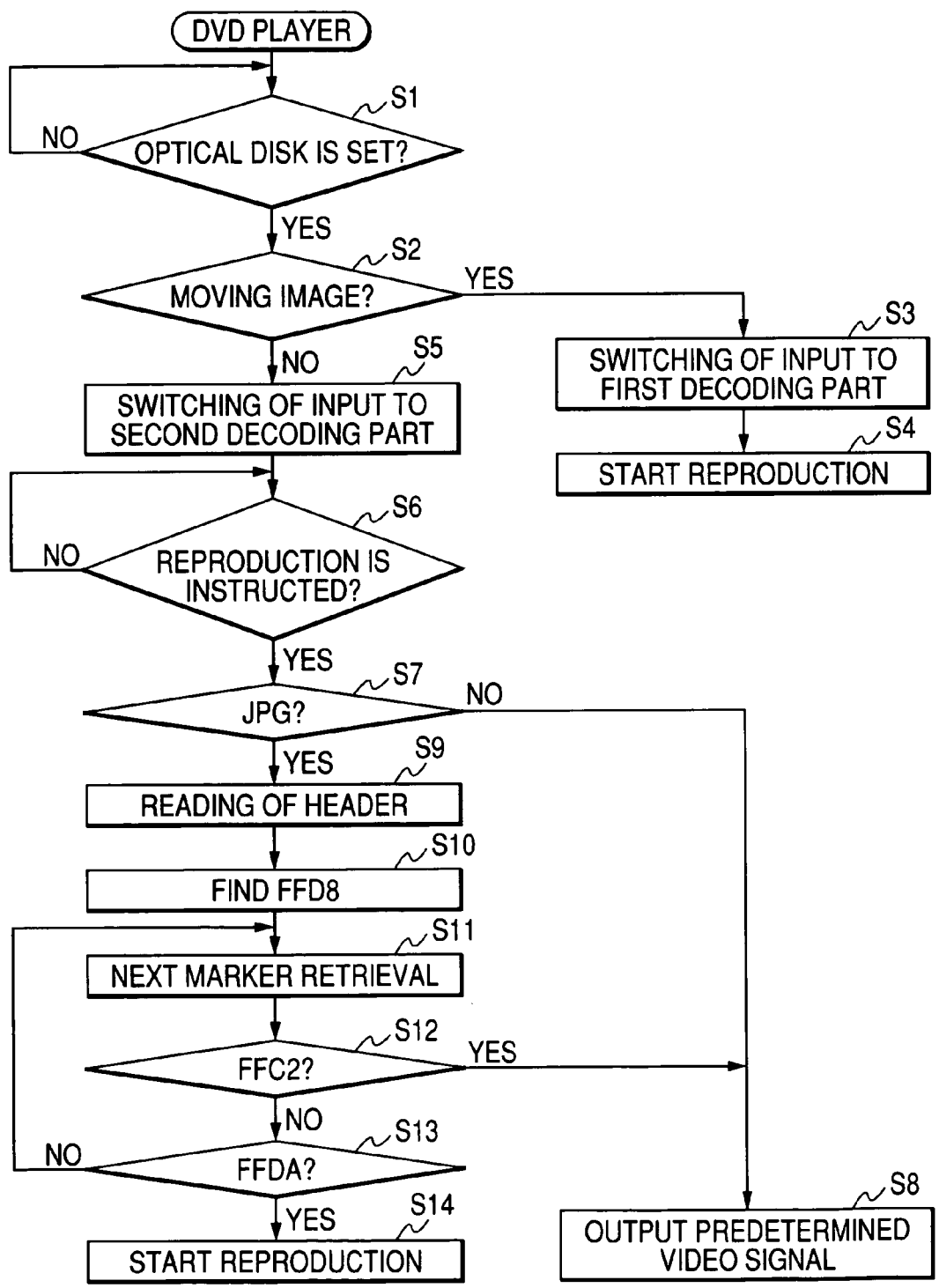
FIG. 2 is a flowchart showing an action of the DVD player according to this embodiment.

Next, an action of the DVD player 1 according to this embodiment will be described. FIG. 2 is a flowchart showing an action of the DVD player according to this embodiment.

When an optical disk is set in a body (S1), the DVD player 1 of this embodiment determines whether this optical disk is an optical disk (DVD in many cases) on which moving image data compressed in an MPEG format is recorded or an optical disk (CD in many cases) on which a still image file is recorded (S2) When the DVD player 1 determines that the optical disk set in the body is the optical disk on which the moving image data compressed in the MPEG format is recorded, the DVD player 1 controls the switching part 4 so that the moving image data read from the optical disk set in the body in the reading part 3 is inputted to the first decoding part 5 (S3). As a result of this, the moving image data read from the optical disk set in the body by the reading part 3 is inputted to the first decoding part 5. The DVD player 1 decodes the moving image data (moving image data compressed by MPEG2) inputted in the first decoding part 5, and the reproduction part 8 generates and outputs a reproduction video signal based on the moving image data decoded, and reproduction is started (S4). At this time, the reproduction part 8 also outputs a reproduction sound signal as well as the reproduction video signal.

Incidentally, the reproduction action started in S4 is completed when an operation of a reproduction stop, etc., is performed with respect to the body.

On the other hand, when the DVD player 1 determines that the optical disk is the optical disk (CD in many cases) on which the still image file is recorded in S2, the DVD player 1 controls the switching part 4 so that the still image data read from the optical disk set in the body in the reading part 3 is inputted to the second decoding part 7 through the header analysis part 6 (S5).

Figure 3:
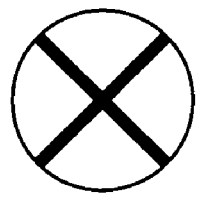
FIG. 3 is a diagram showing an example of display video on a display device connected to a body when reproduction of a still image file incapable of reproduction is instructed.
Figure 4:
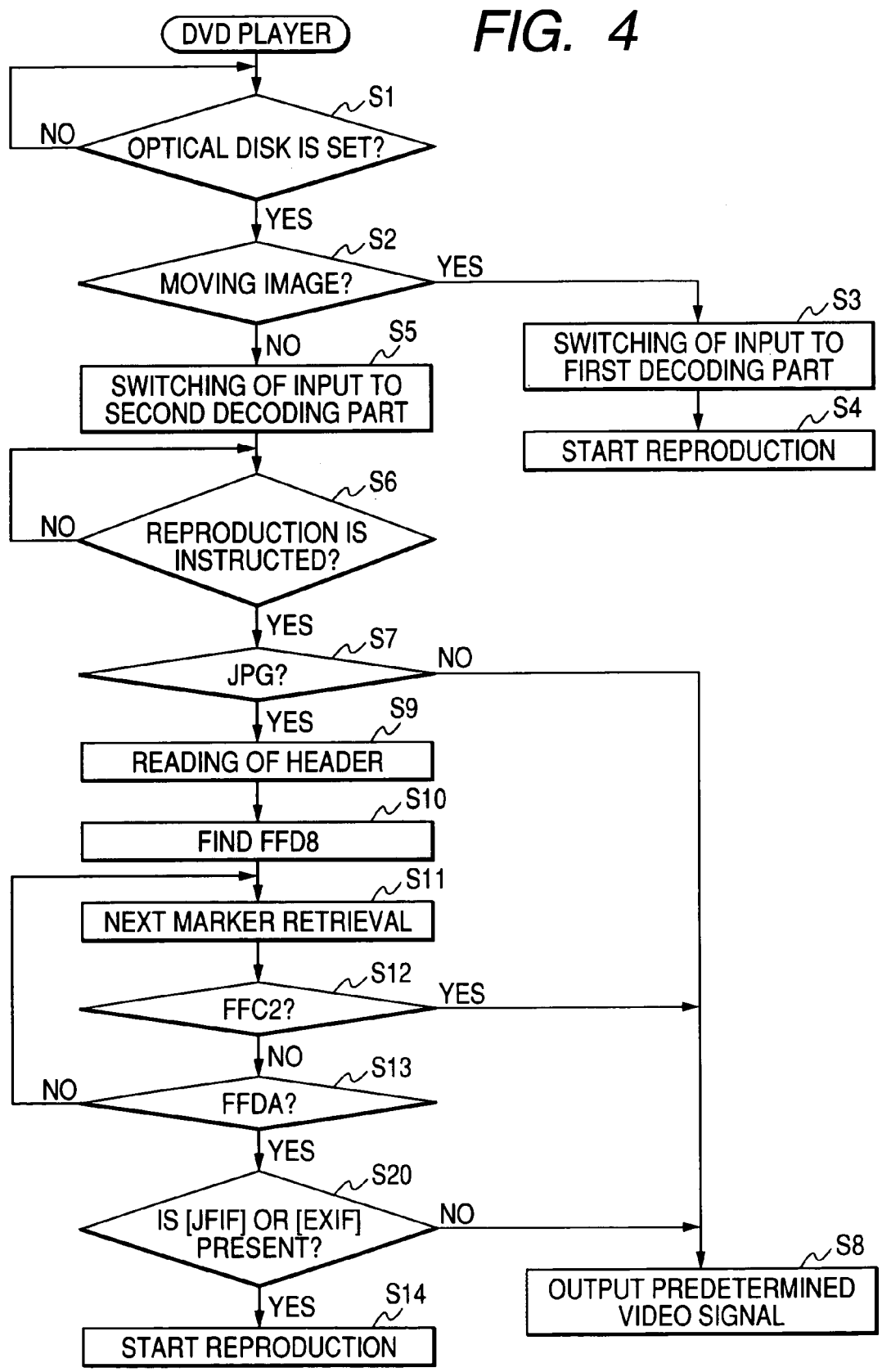
FIG. 4 is a flowchart showing an action of a DVD player according to another embodiment.

Thereafter, the DVD player 1 waits to instruct reproduction of the still image file recorded on the optical disk set in the body (S6), and determines whether or not an extension of the still image file whose reproduction is instructed is JPG (a file of a JPEG format) (S7). When the DVD player 1 determines that it is not JPG in S7, the DVD player 1 decides that the file is the still image file that is not decodable in the second decoding part 7, and outputs a predetermined video signal from the reproduction part 8 (SB). The video signal outputted in S8 is a video signal of video in which a user is notified that reproduction of the still image file incapable of reproduction was instructed, and thereby the user recognizes that fact. A video signal for displaying video shown in FIG. 3 on, for example, a display device connected to the reproduction part 8.

When the DVD player 1 determines that the extension of the still image file whose reproduction is instructed is JPG in S7, the DVD player 1 starts reading of a header of the still image file whose reproduction is instructed in the reading part 3 (S9). The header analysis part 6 determines whether or not a marker [FFC2] indicating that the file is a file of a progressive JPEG format is present in the range from a marker [FFD8] indicating an image start to a marker [FFDA] indicating a scan start with of the inputted header (S10 to S13).

While the processing of S10 to S13 is performed, the DVD player 1 does not input the data (header) read from the optical disk by the reading part 3 to the second decoding part 7. During this time period, the second decoding part 7 stops.

When the marker [FFC2] indicating that it is the progressive JPEG format is found in the processing of S10 to S13, the DVD player 1 stops reading of the still image file from the optical disk in the reading part 3 and outputs a predetermined video signal from the reproduction part 8 (S8).

When the marker [FFC2] indicating that it is the progressive JPEG format is not found in the processing of S10 to S13, the DVD player 1 decides that the still image file whose reproduction is instructed can be reproduced, and inputs the still image file read from the optical disk in the reading part 3 to the second decoding part 7 through the header analysis part 6, and decodes the still image file by the second decoding part 7. The reproduction part 8 then generates and outputs a reproduction video signal based on the still image file decoded by the second decoding part, and reproduction is started (S14).

Thus, the DVD player 1 of this embodiment is the so-called DVD player with a JPEG reproduction function, and the moving image data compressed in MPEG2 recorded on the optical disk (DVD) set in the body can be reproduced and also the still image file compressed in the JPEG format, for example, the pickup image picked up by the digital camera can be reproduced. Also, with respect to the still image files other than the JPEG format, it is decided that reproduction cannot be performed by a difference in the extension, and a user is notified. Further, with respect to the still image file incapable of reproduction (incapable of decoding by the second decoding part 7) even in the case of the still image file of the JPEG format, that is, the still image file of the progressive JPEG format, a decision is made by a header analysis in the header analysis part 6 before decoding by the second decoding part 7, and the user is notified that reproduction cannot be performed. Thus, when reproduction of the still image file incapable of reproduction in the body is instructed, the DVD player 1 of this embodiment notifies the user that the still image file whose reproduction is instructed cannot be reproduced in the body without decoding still image data about its still image file, so that this fact can speedily be recognized by the user (time taken to notify the user that the still image file cannot be reproduced can be shortened) and operability of the user can be improved.

Also, when reproduction of the still image file incapable of reproduction in the DVD player 1 is instructed, it is constructed so as to output a video signal indicating that fact, so that the fact can surely be recognized by the user.

In the embodiment, it is decided that the file is the still image file of the JPEG format when the extension of the still image file selected is JPG, but recently, a still image file whose entity is a GIF format has circulated even when a file extension is JPG. Thus, even when the file extension is JPG, a file whose entity is not the JPEG format is present.

In consideration of such present circumstances, by adding the following step (S20) to next to S13 described in the embodiment, it may be constructed so as to determine whether or not a file is a still image file whose entity is not a JPEG format, for example, a GIF format though a file extension is JPG.

Specifically, when a marker [FFC2] indicating that it is a progressive JPEG format is not found and a marker [FFDA] indicating a scan start is found, in S20, it is determined whether or not a code of [JFIF] or [EXIF] has been included in the header analysis described above. The code of [JFIF] or [EXIF] is a code indicating that a file is a file of a JPEG format, and the code of [JFIF] or [EXIF] is always included in a header of the file of the JPEG format.

When it is determined that [JFIF] or [EXIF] is included in S20, the still image file specified is a file whose entity is not the JPEG format, and is a still image file incapable of reproduction in the body. In this case, processing of S8 has only to be performed.

As a result of this, it can be decided that the still image file whose entity is not the JPEG format though the file extension is JPG is the still image file incapable of reproduction before decoding in the second decoding part 7. Therefore, the user can speedily be notified that reproduction of the still image file incapable of reproduction in the DVD player 1 is instructed more surely (time taken to notify the user that the still image file cannot be reproduced can be shortened), and operability of the user can be improved more.

Incidentally, in the embodiment, the invention of the present application has been described by taking the DVD player with a JPEG reproduction function as an example, but can also be applied to an optical disk apparatus without a function of reproducing moving image data.

As described above, according to the invention, when a still image file whose reproduction is instructed is a file incapable of reproduction, a user can speedily be notified of that fact, so that operability of the user can be improved.

Also, when a still image file whose reproduction is instructed is a still image file incapable of reproduction, it is constructed so as to output a video signal indicating that fact, so that the fact that reproduction of the still image file incapable of reproduction is instructed can surely be recognized by a user.

What is claimed is:

1. An optical disk reproducing apparatus comprising:
   a reading unit configured to read image data recorded on an optical disk;
   a first decoding unit configured to decode moving image data in the image data read by the reading unit;
   a second decoding unit configured to decode still image file including still image data in the image data read by the reading unit;
   a switching unit configured to receive the image data from the reading unit, output the image data to the first decoding unit when the image data is the moving image data, and output the image data to the second decoding unit when the image data is the still image data;
   a header analysis unit disposed between the switching unit and the second decoding unit and configured to analyze a header of the still image file;
   a reproduction unit connected to the first decoding unit and the second decoding unit and configured to output a reproduction video signal of the image data decoded by the first decoding unit or by the second decoding unit; and
   a control unit configured to control the reading unit, the first decoding unit, the second decoding unit, the switching unit, the header analysis unit, and the reproduction unit,
   wherein the second decoding unit has a function of decoding still image file compressed in a base line JPEG format and in a lossless JPEG format and does not have a function of decoding still image file compressed in a format other than a JPEG format and in a progressive JPEG format,
   wherein when receiving an instruction to reproduce the still image file recorded on the optical disk, the control unit determines whether or not an extension of the still image file recorded on the optical disk is JPG,
   wherein if the control unit determines that the extension of the still image file is not JPG, the reproduction unit outputs a predetermined video signal for notifying a user that the optical disk reproducing apparatus cannot reproduce the still image file, wherein if the control unit determines that the extension of the still image file is JPG, the header analysis unit starts analyzing the header of the still image file to determine whether or not a marker FFC2 indicative of the progressive JPEG format is present in a range from a marker FFD8 indicative of an image start to a marker FFDA indicative of scan start, wherein if the marker FFC2 is present in the range from the marker FFD8 to the marker FFDA, it is determined that the still image file is compressed in the progressive JPEG format and the reproduction unit outputs the predetermined video signal, wherein if the marker FFC2 is not present in the range from the marker FFD8 to the marker FFDA it is determined that the still image file is not compressed in the progressive JPEG format and the control unit determines whether or not a code of JFIF or a code of EXIF is included in the header of the still image file, wherein if the control unit determines that neither the code of JFIF nor the code of EXIF is not included in the header of the still image file, the reproduction unit outputs the predetermined video signal, wherein if the control unit determines that either the code of JFIF or the code of EXIF is included in the header of the still image file, the second decoding unit decodes the still image file and outputs the decoded still image file to the reproduction unit, and wherein the reading unit stops reading the image data and the second decoding unit stops decoding the still image data while the header analysis unit analyses the header of the still image file.

2. The optical disk reproducing apparatus as claimed in claim 1, wherein the first decoding unit has a function of decoding moving image data compressed in MPEG2.

3. The optical disk reproducing apparatus as claimed in claim 1, wherein the optical disk is a DVD and the optical disk reproducing apparatus is a DVD player.

* * * * *